United States Patent
Morteza (10) Patent No.: US 10,584,686 B2
(45) Date of Patent: Mar. 10, 2020

(54) ENERGY STORAGE APPARATUS

(71) Applicant: NPGS INNOVATIONS USA, LLC, Odessa, FL (US)

(72) Inventor: Aghakhani Morteza, Tehran (IR)

(73) Assignee: Next Ressource Generation GmbH, Hamburg (DE)

( * ) Notice: Subject to any disclaimer, the term of this patent is extended or adjusted under 35 U.S.C. 154(b) by 0 days.

(21) Appl. No.: 16/078,830

(22) PCT Filed: Jan. 26, 2017

(86) PCT No.: PCT/IB2017/050400
§ 371 (c)(1),
(2) Date: Aug. 22, 2018

(87) PCT Pub. No.: WO2017/144986
PCT Pub. Date: Aug. 31, 2017

(65) Prior Publication Data
US 2019/0048856 A1    Feb. 14, 2019

(30) Foreign Application Priority Data
Feb. 23, 2016    (GB) .................................. 1603065.2

(51) Int. Cl.
*F03G 1/08*    (2006.01)
*F15B 15/02*    (2006.01)
(Continued)

(52) U.S. Cl.
CPC ............... *F03G 1/08* (2013.01); *F15B 15/02* (2013.01); *F15B 15/088* (2013.01);
(Continued)

(58) Field of Classification Search
CPC ..... F03G 1/00; F03G 1/06; F03G 1/08; F15B 15/02; F15B 15/088; F15B 15/202; F15B 15/261; H02K 7/116
See application file for complete search history.

(56) References Cited

U.S. PATENT DOCUMENTS 1,076,314 A * 10/1913 Pitman ...................... F03G 1/00
                                                          185/37
1,673,197 A *  6/1928 Kollmann ................. F03G 1/00
                                                          185/37
(Continued)

OTHER PUBLICATIONS

International Search Report, European Patent Office, dated Apr. 25, 2017.

*Primary Examiner* — Alan B Waits
(74) *Attorney, Agent, or Firm* — Bay State IP, LLC (57) ABSTRACT

The present invention relates to an energy storage apparatus (10) comprising a compressible spring (11) wound around a main shaft (28) extending between a releasing means (20) and a compressing means (21), said compressing means (21) and releasing means (20) being in a fixedly attached relationship with said compressible spring (11) at two ends of the main shaft (28), said compressing means (21) and releasing means (20) being rotatable at different speeds so as to compress the compressible spring (11) at one longitudinal side of the main shaft (28) while simultaneously releasing the compressible spring (11) at the other longitudinal side, said energy storage apparatus (10) further comprising a hydraulic jack (26) continuously driven by a hydraulic pump (13) in the manner that said compressible spring (11) is compressed by said compressing means (21) to which rotational movement is imparted by said hydraulic jack (26).

19 Claims, 9 Drawing Sheets

(51) Int. Cl.
*F15B 15/08* (2006.01)
*F15B 15/20* (2006.01)
*F15B 15/26* (2006.01)
*H02K 7/116* (2006.01)

(52) U.S. Cl.
CPC .......... *F15B 15/202* (2013.01); *F15B 15/261* (2013.01); *H02K 7/116* (2013.01)

(56) References Cited

U.S. PATENT DOCUMENTS

| | | | | |
|---|---|---|---|---|
| 4,181,299 | A | * | 1/1980 | Foster .................. A47D 13/105 472/119 |
| 2011/0025056 | A1 | | 2/2011 | Cripps |
| 2014/0299415 | A1 | * | 10/2014 | Barbiero .................. F03G 1/00 185/2 |
| 2015/0007558 | A1 | * | 1/2015 | Warren .................... F03G 1/00 60/527 |
| 2015/0136528 | A1 | * | 5/2015 | Tostado .................. F03G 1/00 185/37 |
| 2019/0048856 | A1 | * | 2/2019 | Morteza .................. F03G 1/00 |
| 2019/0242368 | A1 | * | 8/2019 | Wang ........................ F03G 1/06 |

\* cited by examiner

ENERGY STORAGE APPARATUS

CROSS REFERENCE TO RELATED APPLICATION

This application is for entry into the U.S. National Phase under § 371 for International Application No. PCT/IB2017/050400 having an international filing date of Jan. 26, 2017, and from which priority is claimed under all applicable sections of Title 35 of the United States Code including, but not limited to, Sections 120, 363, and 365(c), and which in turn claims priority under 35 USC 119 to Great Britain Patent Application No. 1603065.2 filed on Feb. 23, 2016.

TECHNICAL FIELD OF THE PRESENT INVENTION

The present invention relates to an energy storage apparatus comprising a plurality of mechanical components to enable a compressible spring in association with a rotatable shaft to store potential energy whose premature release is prevented.

BACKGROUND OF THE PRESENT INVENTION

It is well-known that an elongated coil type spring being compressed can store potential energy. Such energy as stored by the elongated coil spring cannot allow operation of a particular device requiring mechanical power over a relatively extensive period of time as the stored energy will be consumed in a non-controlled manner. In other words, the potential energy stored by the spring is not usable as premature release of such energy cannot be ensured.

Among others, a prior art publication in the technical field of the invention may be referred to as U.S. Pat. No. 4,181,299, which discloses a spring powered swing incorporating a frame supporting a swing seat for to and fro movement, a spring motor assembly within a sealed enclosure and having a male coupling head detachably engageable with a female component formed on said swing; there being a crank-controlled escapement provided with said spring motor assembly productive of incremental release of power stored in said spring. The swing seat support and the escapement crank are operatively detachably interengageable.

Therefore U.S. Pat. No. 4,181,299 discloses a spring-driven system by which periodic release of limited increments of spring energy is provided and a relatively extended operational period is obtained.

The present invention, on the other hand, is devised under the recognition that a compressible spring can be simultaneously compressed and uncompressed at opposite ends of a main shaft as provided by the characterizing features defined in claim 1.

OBJECTS OF THE PRESENT INVENTION

Primary object of the present invention is to provide an energy storage apparatus storing potential energy in a compressible spring.

Another object of the present invention is to provide an energy storage apparatus storing potential energy usable for particular purposes through an available outer shaft.

Further an object of the present invention is to provide an energy storage apparatus storing potential energy in a compressible spring by way of continuously transferring compression energy to said compressible spring in a predefined rotational compression speed.

Still further an object of the present invention is to provide an energy storage apparatus storing potential energy in a compressible spring acting as a spring system by which continuous release of limited amounts of spring energy can be provided over a relatively extended operational period.

Yet still further an object of the present invention is to provide an energy storage apparatus storing potential energy in a compressible spring that can be simultaneously compressed and uncompressed at opposite ends of a main shaft.

Yet still further an object of the present invention is to provide an energy storage apparatus storing potential energy in a compressible spring continuously maintaining its compressed state due to the continuously effected compressing movement.

SUMMARY OF THE PRESENT INVENTION

An energy storage apparatus is proposed: comprising a compressible spring, optionally wound around a main shaft extending between a releasing means and a compressing means, said compressing means and releasing means being in a fixedly attached relationship with said compressible spring at two ends of the main shaft, said compressing means and releasing means being rotatable at different speeds so as to compress the compressible spring at one longitudinal side of the main shaft while simultaneously releasing the compressible spring at the other longitudinal side, said energy storage apparatus further comprising a hydraulic jack continuously driven by a hydraulic pump in the manner that said compressible spring is compressed by said compressing means to which rotational movement is imparted by said hydraulic jack and said hydraulic jack is periodically released by a hydraulic valve in constant intervals to provide continuous unidirectional rotary movement of constant speed to said compressing means.

BRIEF DESCRIPTION OF THE TECHNICAL DRAWINGS

Accompanying drawings are given solely for the purpose of exemplifying an energy storage apparatus, whose advantages over prior art were outlined above and will be explained in brief hereinafter.

The drawings are not meant to delimit the scope of protection as identified in the Claims, nor should they be referred to alone in an effort to interpret the scope identified in said Claims without recourse to the technical disclosure in the description of the present invention.

DETAILED DESCRIPTION OF THE PRESENT INVENTION

The following numerals are assigned to different part number used in the detailed description:
- 10) Energy storage apparatus
- 11) Compressible spring
- 12) Transmission gear
- 13) Hydraulic pump
- 14) Power unit
- 15) Outer shaft
- 16) Drive gear
- 17) Tubular conduit
- 18) Shaft coupling
- 19) Generator
- 20) Releasing means
- 21) Compressing means
- 22) Hydraulic valve
- 23) Electric motor
- 24) Terminal gear
- 25) Toothed track
- 26) Hydraulic jack
- 27) Spring block portion
- 28) Main shaft
- 29) Shaft gear
- 30) Intermediate gear
- 31) Rotary balance weight
- 32) Lever
- 33) Generator housing
- 34) Support platform
- 35) Counter spring
- 36) Plunger
- 37) Cylinder body
- 38) Blade
- 39) Blade holder
- 40) Valve control means
- 41) Crank arm
- 42) Limit projection The present invention relates an energy storage apparatus (10) generally designated with the numeral 10, consisting of a number of mechanical and electromechanical components as will be delineated hereinafter. A hydraulic pump (13) is operated to drive a hydraulic jack (26), which in turn effectuates transfer of energy to a spring system already loaded with potential energy. The present invention provides that while potential energy stored in a compressible spring (11) is usable for particular purposes through an available outer shaft (15), the compressible spring (11) itself is continuously transferred energy in a predefined rotational compression speed and it also acts as a spring system by which continuous release of limited amounts of spring energy can be provided over a relatively extended operational period.

Figure 1:
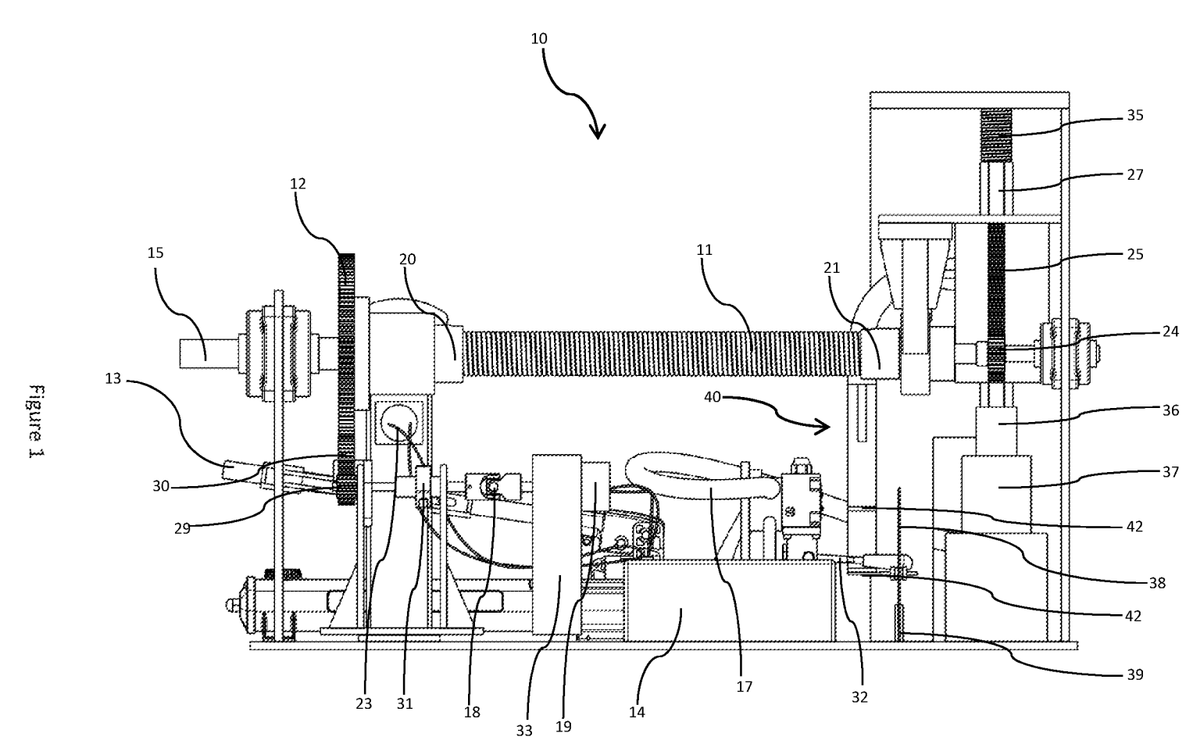
FIG. 1 demonstrates side view of the energy storage apparatus according to the present invention.
Figure 8:
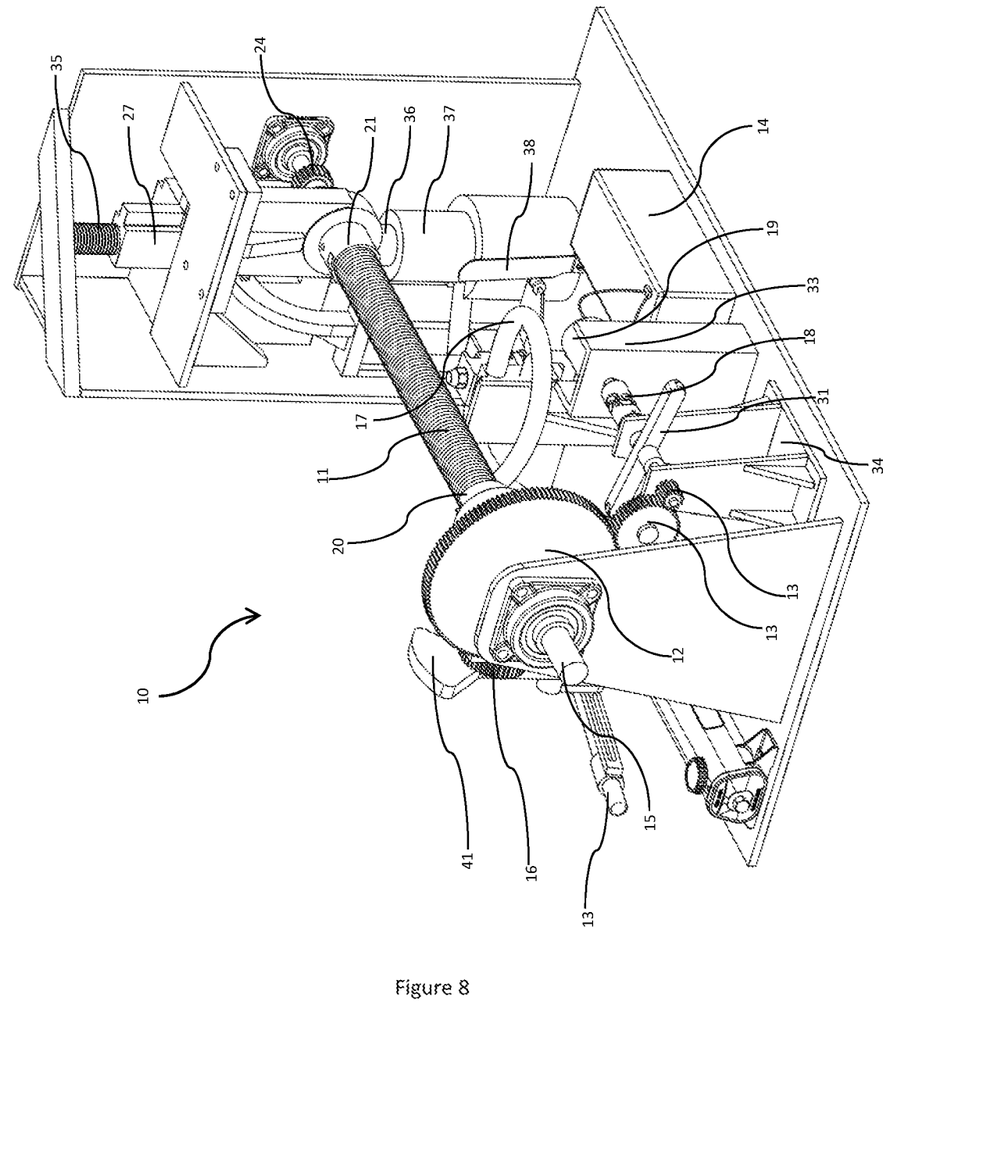
FIG. 8 demonstrates a first side perspective view of the energy storage apparatus according to the present invention.
Figure 9:
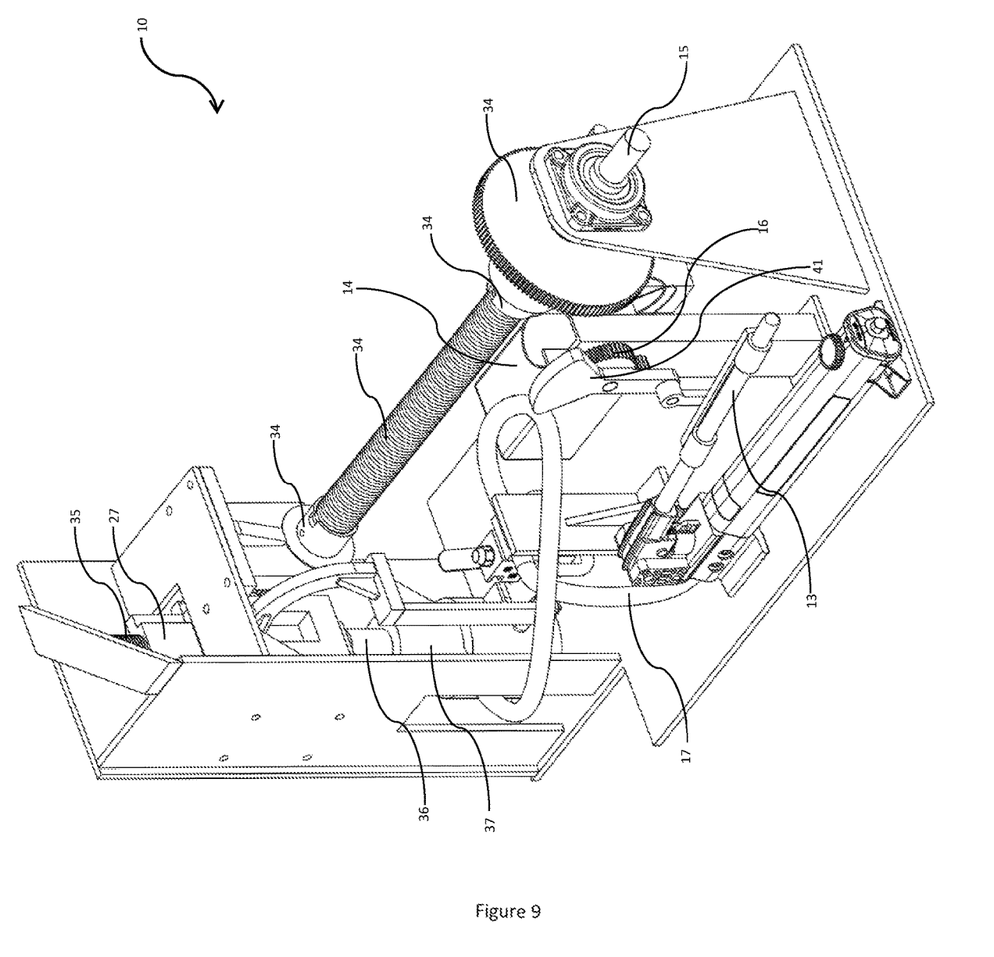
FIG. 9 demonstrates a second side perspective view of the energy storage apparatus according to the present invention.

Now referring to FIG. 1, demonstrating side view of the energy storage apparatus (10), a transmission gear (12) turns a second gear, namely an intermediate gear (30) typically in meshed relation with a shaft gear (29) such that the latter is rotatable to drive, through a shaft coupling (18), an electrical generator (19) within a generator housing (33), said electrical generator (19) being in electrical connection with a power unit (14), i.e. an electrical battery. Finally, the power unit (14) effectuates constant speed rotation and therefore speed regulation of an electric motor (23) as will be explained in further detail below. It is, however, to be noted that, the transmission gear (12) optionally contributes to drive the electrical generator (19) to charge said power unit (14). A support platform (35) with upright carrying members can be used to securely support the shaft. Further, an optional rotary balance weight (31) can be coupled to the shaft as shown in the exemplary embodiments of FIG. 8.

Figure 2:
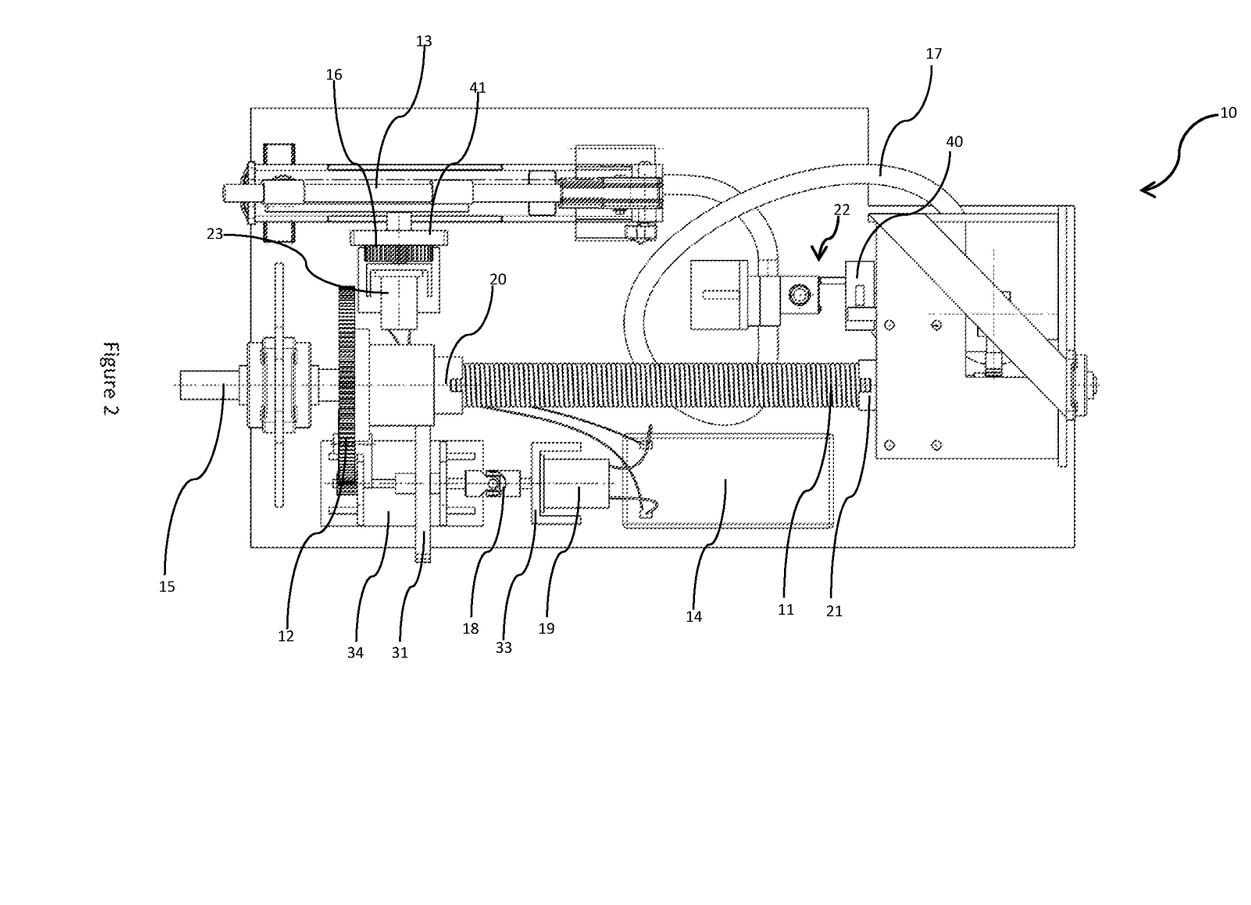
FIG. 2 demonstrates top view of the energy storage apparatus according to the present invention.
Figure 3:
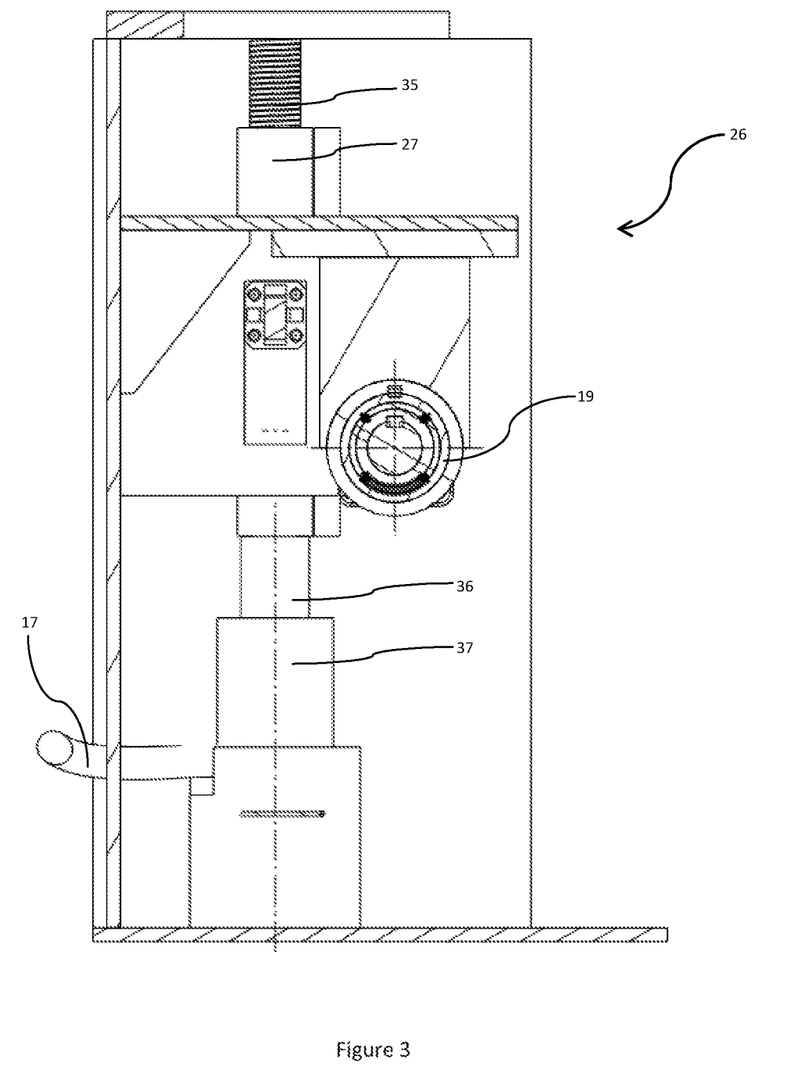
FIG. 3 demonstrates a cross-sectional view of a hydraulic jack according to the present invention.

In reference to FIG. 2, said energy storage apparatus (10) incorporates a compressing means (21) and a releasing means (20) in a fixedly attached relationship with said compressible spring (11) at two ends thereof such that for instance a helically-coiled compressible spring (11) wound around a main shaft (28) extending between said compressing means (21) and said releasing means (20) can be simultaneously compressed and uncompressed at opposite ends in response to rotation of said compressing means (21) relative to the main shaft (28). In other words, the compressing means (21) and the releasing means (20) at two longitudinal ends of the main shaft (28) to which said compressible spring (11) is fixedly secured at two longitudinal sides can rotate at different speeds so as to compress the compressible spring (11) at one longitudinal side while simultaneously releasing the same at the other longitudinal side.

While the compressing means (21) can rotate around the main shaft (28) in a relative speed with respect to the speed of the main shaft (28), the releasing means (20) rotates at the same speed with the main shaft (28). Therefore, the compressing means (21) effectuates compressing of the compressible spring (11) and the thereby stored potential energy allows the releasing means (20) to induce rotational movement of the main shaft (28), which also rotates said transmission gear (12) as explained above. The invention therefore provides that the compressible spring (11) continuously maintains its compressed state due to the continuously effected driving movement rotating said compressing means (21) by the hydraulic jack (26), while allowing energy release by said releasing means (20). In sum, when the hydraulic pump (13) is operated to continuously drive the hydraulic jack (26), the latter is periodically released to continue the compressing operation and potential energy is transferred to said compressible spring (11) by means of said compressing means (21).

According to the present invention, operation of the energy storage apparatus (10) is initiated such that the compressible spring (11) in already compressed condition (for instance manually through said transmission gear (12)) is further compressed by the compressing means (21) thanks to the hydraulic jack (26) providing rotary movement thereto, upon which said releasing means (20) allows release of mechanical energy by way of rotation. Therefore, the energy storage apparatus (10) of the present invention relies on the equilibrium of released energy with compression energy imparted to the system, reached during release of the potential energy of the already compressed compressible spring (11) by way of simultaneously applying compressing force to the same. As already noted, the compression energy is generated by said power unit (14) supplying power to said electric motor (23) in mechanical connection with the hydraulic pump (13), the latter being in turn operated to drive the hydraulic jack (26).

According to the present invention, in order for maintaining compressed operational condition of the compressible spring (11) while at the same time transferring stored energy out the same, said compressible spring (11) must be continuously compressed in a predetermined manner in terms of a constant speed of rotation being imparted to said compressing means (21).

To this end, the rotational speed of said electric motor (23) being kept constant by the power unit (14) also assuming the role of regulator, the hydraulic pump (13) typically pressurizes the hydraulic jack (26) being connected thereto. The constant pressure hydraulic pump (13) supplies hydraulic oil to the hydraulic jack (26), permitting the jack ram to extend in a conventional manner. A tubular conduit with respective hydraulic fluid ports is designated with the numeral 17.

Figure 4:
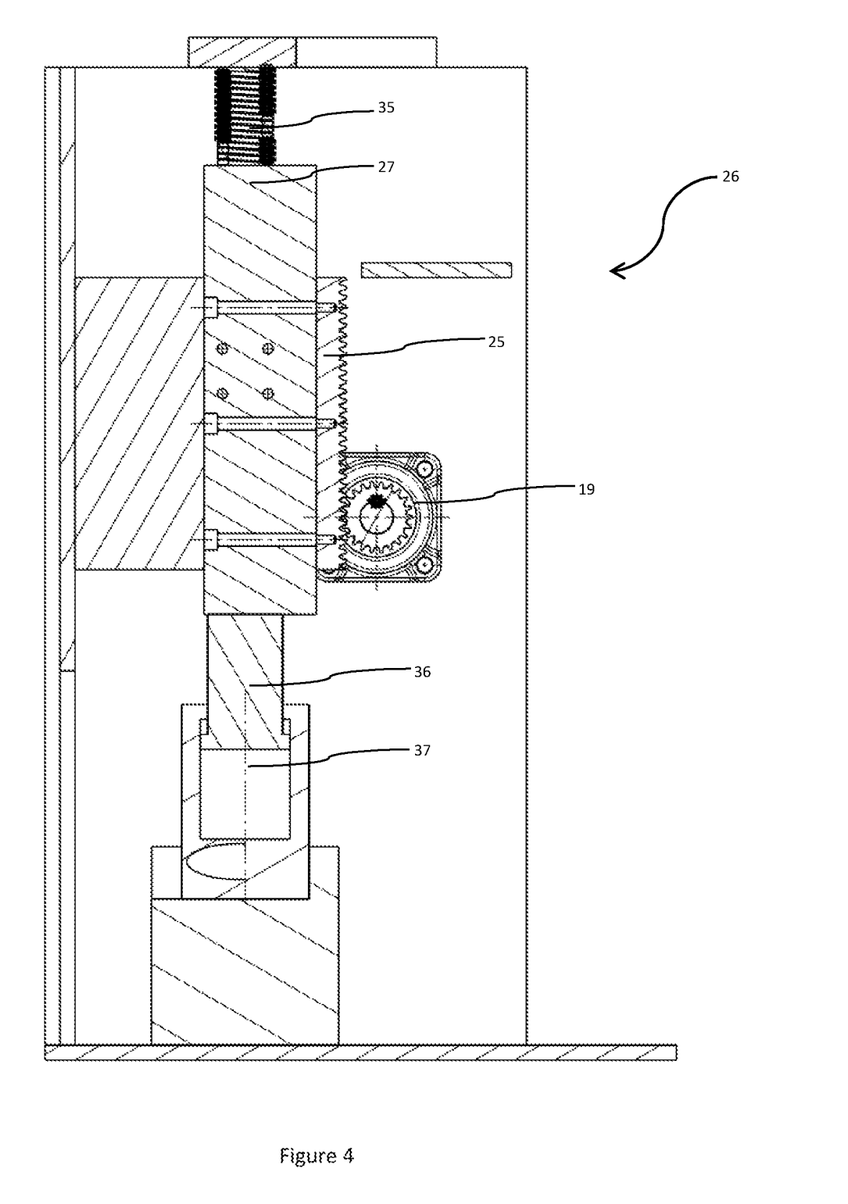
FIG. 4 demonstrates an alternative cross-sectional view of the hydraulic jack according to the present invention.
Figure 5:
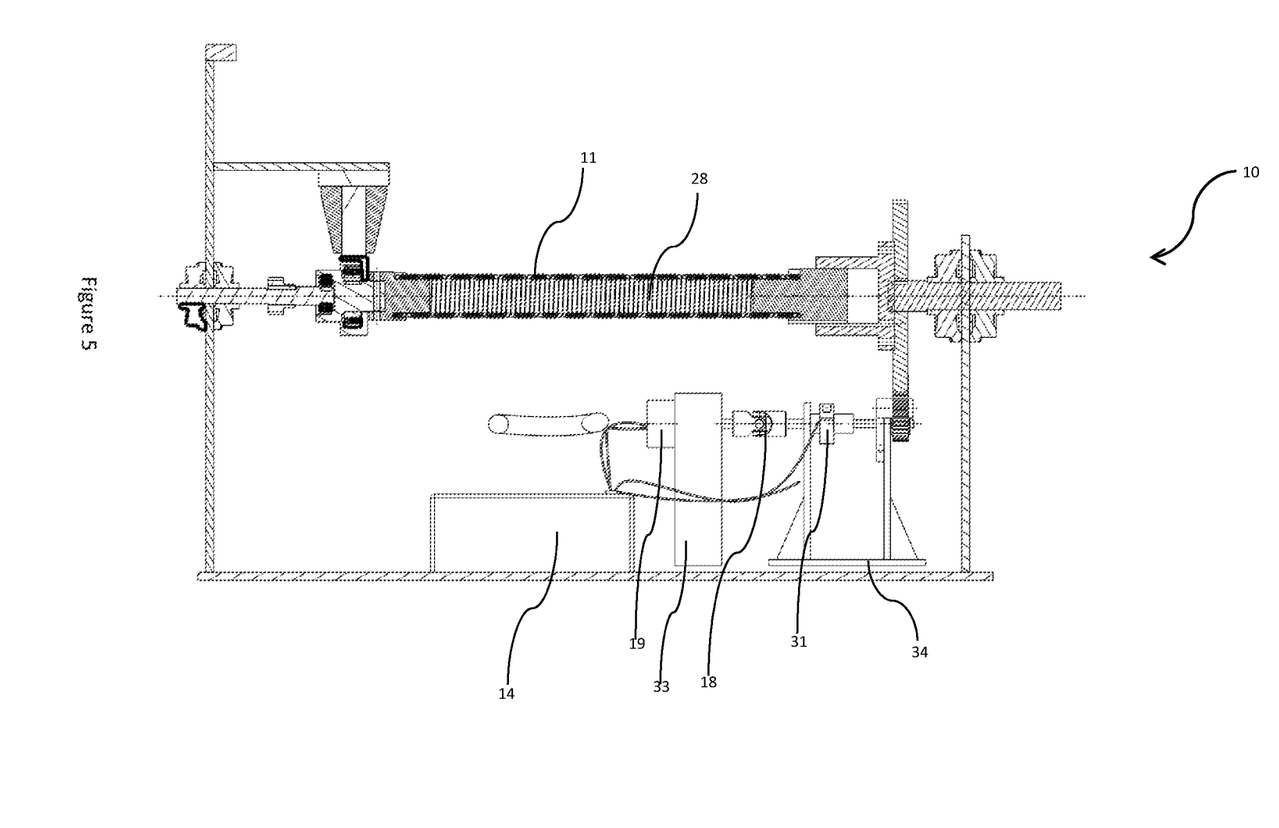
FIG. 5 demonstrates a lateral cross-sectional view of the energy storage apparatus according to the present invention.

The hydraulic pump (13) communicates with the hydraulic jack (26) through a hydraulic valve (22) in the form of a lever-operated directional control valve. The hydraulic valve (22) acts as a switch to release the hydraulic jack (26) when a valve control means (40) in connection with a (linear) toothed track (25) drives the lever (32) of the hydraulic valve (22). More specifically, when the plunger (36) of the hydraulic jack (26) displaces in the cylindrical body (37) of the jack to reach its extended position, it imparts linear movement to the toothed track (25) which moves perpendicular to the base of the energy storage apparatus (10), whereby the toothed track (25) rotates a terminal gear (24) rotatably supported in meshed engagement relation with said toothed track (25). The shaft driving rail (25) rotating the terminal gear (24) is depicted in FIG. 4.

Figure 6:
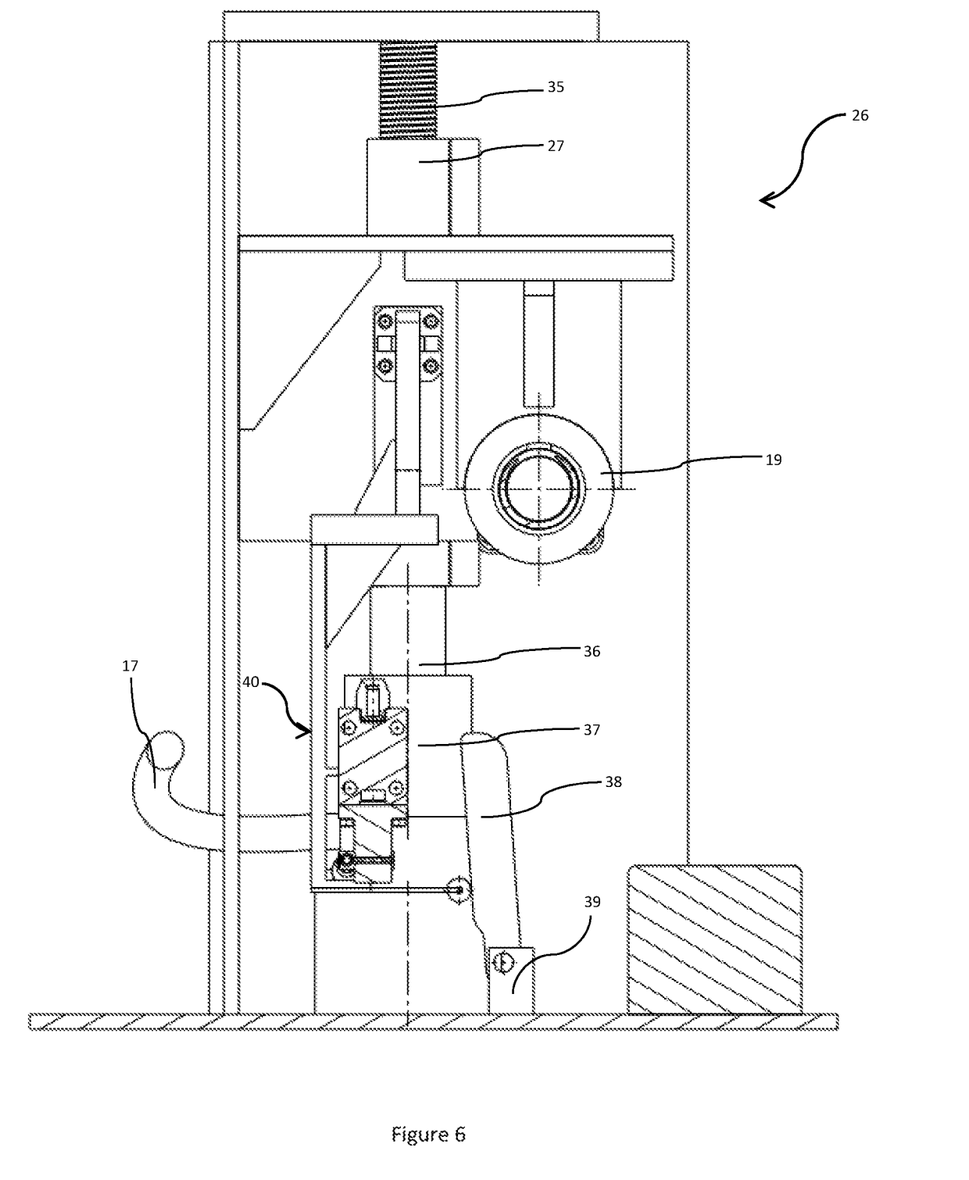
FIG. 6 demonstrates an alternative cross-sectional view of the hydraulic jack together with a valve control means and a blade-blade holder assembly according to the present invention.
Figure 7:
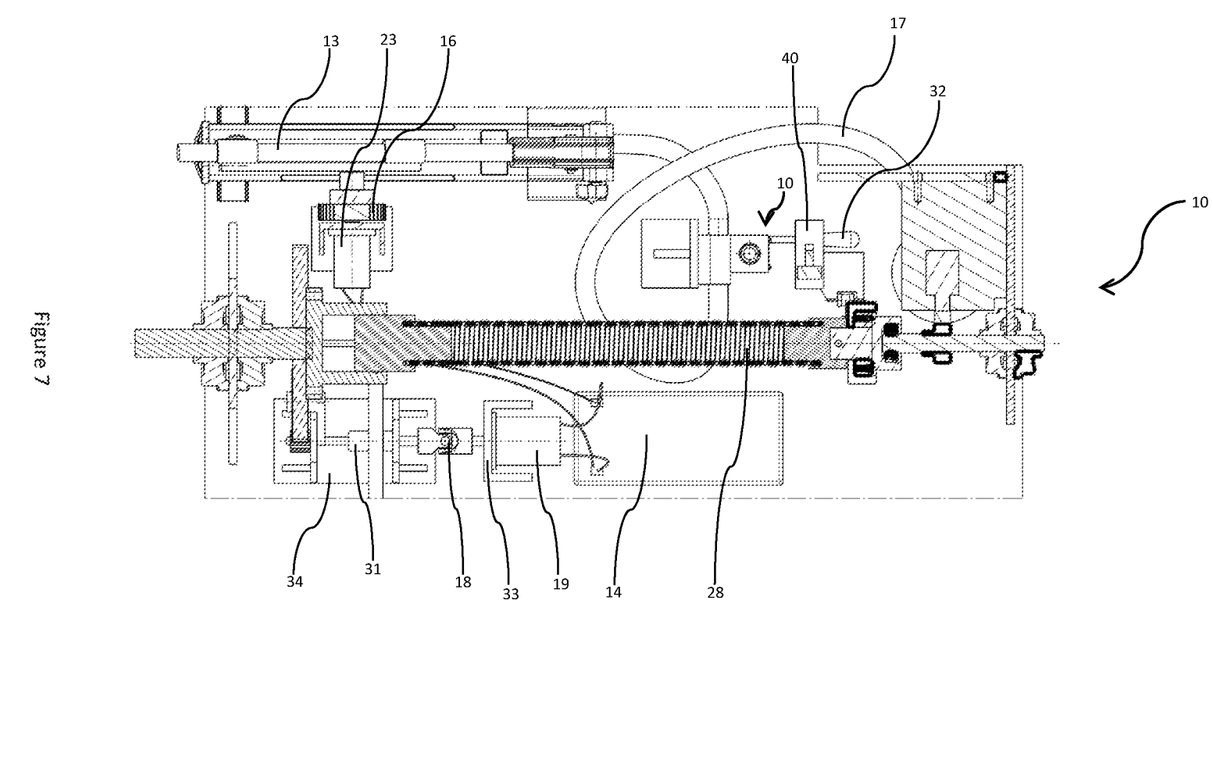
FIG. 7 demonstrates a top cross-sectional view of the energy storage apparatus according to the present invention.

In reference to FIG. 6 demonstrating a cross-sectional view along a plane perpendicular to the longitudinal axis of the compressible spring (11), the valve control means (40) having two limit projections (42) switches the lever (32) of the hydraulic valve (22) only when the plunger (36) and therefore the toothed track (25) reaches a predetermined uppermost position, upon which the lower limit projection (42) of the valve control means (40) pushes the lever up so as to switch the hydraulic valve (22) on, whereby the hydraulic jack (26) is released and the plunger (36) takes its retracted position in the cylindrical body (37). The lever (32), limit projections (42) and the valve control means (40) are best seen in FIG. 1.

Upon release of the hydraulic jack (26), the plunger (36) must resume its upwards linear movement in order for continuing to compress the compressible spring (11) by rotating said terminal gear (24) through said toothed track (25). Therefore, when the hydraulic jack (26) is released, the lever (32) is immediately taken to its operational position allowing fluid communication between the hydraulic pump (13) and the hydraulic jack (26). This is ensured by the upper limit projection (42) of the valve control means (40) as it also immediately takes its lowermost predetermined position when the plunger (36) is retracted.

As a second measure to ensure positioning of the lever (32) in its original position, a blade (38) pivotally supported by a blade holder (39) automatically bends over said lever (32) to keep the same in an orientation parallel to the base plane of the energy storage apparatus (10). An extended flap portion in connection with the lower limit projection (42) allows the blade (38) to pivotally drop in the direction of said lever (32). The extended flap portion together with said lower limit projection (42) cooperating with the blade (38) rotatably attached to the blade holder (39) are best seen in FIG. 1. Further, the slightly inclined lateral bottom edge of the blade (38) rotatable around a pivot axis is shown in FIG. 6. As seen in FIG. 6, the extended flap portion integral with said lower limit projection (42) moving up and down selectively allows rotation of the blade (38) only subsequent to the switching movement of the lever (32). The lever (32) itself is not seen in the cross-sectional view of FIG. 6.

It is of particular importance that a back stop mechanism prevents the terminal gear (24) from rotating in a direction opposite to the compressing direction so that the compressing means (21) in direct coaxial communication therewith is not allowed to rotate in the uncompressing direction during the reverse displacement of the plunger (36) to resume its upward movement between retracted to extended positions.

According to the present invention, the electric motor's (23) rotational speed driving the hydraulic pump (13) through a drive gear (16) and a crank arm (41). A counter spring (35) in connection with a spring block portion (27) smooths the operation of the plunger (36) particularly during periodical retracting movements of the latter each time the lever (32) is switched on.

In accordance with the present invention, the helically-coiled compressible spring (11) of the spiral type is formed of high strength metal or composite material to allow the spring to be loaded to a stress without passing the limit where plastic deflection starts.

In a nutshell, the present invention proposes an energy storage apparatus (10) comprising a compressible spring (11) extending between a releasing means (20) and a compressing means (21), said compressing means (21) and releasing means (20) being in a fixedly attached relationship with said compressible spring (11) at two ends thereof, said compressing means (21) and releasing means (20) being rotatable at different speeds so as to compress the compressible spring (11) at one longitudinal side thereof while simultaneously releasing the compressible spring (11) at the other longitudinal side, said energy storage apparatus (10) further comprising a hydraulic jack (26) continuously driven by a hydraulic pump (13) in the manner that said compressible spring (11) is compressed by said compressing means (21) to which rotational movement is imparted by said hydraulic jack (26) and said hydraulic jack (26) is periodically released by a hydraulic valve (22) in constant intervals to provide continuous unidirectional rotary movement of constant speed to said compressing means (21).

In one embodiment of the present invention the compressible spring (11) is wound around a main shaft (28) and said compressing means (21) and releasing means (20) are in a fixedly attached relationship with said compressible spring (11) at two ends of the main shaft (28).

In a further embodiment of the present invention, said compressing means (21) is rotatable relative to said main shaft (28) and said releasing means (20) is rotatable in synchronism with the main shaft (28).

In a further embodiment of the present invention, the hydraulic jack (26) moves a toothed track (25) rotating a terminal gear (24) rotatably supported in meshed engagement relation with said toothed track (25).

In a still further embodiment of the present invention, the apparatus further comprises a valve control means (40) synchronously movable in connection with a plunger (36) of the hydraulic jack (26) such that two limit projections (42) of the valve control means (40) activates a lever (32) of the hydraulic valve (22) at an extended position of the plunger (36) and subsequently instantly take said lever (32) to a non-activated position in a retracted position of the plunger (36).

In a yet still further embodiment of the present invention, a lower limit projection (42) of the valve control means (40) moves the lever (32) up to release the hydraulic jack (26) and an upper limit projection (42) takes the lever to the non-activated position at the final stage of the retraction of the plunger (36).

In a yet still further embodiment of the present invention, the lower limit projection (42) of the valve control means (40) switches the lever (32) of the hydraulic valve (22) only when the toothed track (25) reaches a predetermined uppermost position.

In a yet still further embodiment of the present invention, the energy storage apparatus (10) further comprises a blade (38) pivotally supported by a blade holder (39) in the manner that said blade (38) automatically bends over said lever (32) at an instant subsequent to when said lever (32) is taken to the non-activated position by the upper limit projection (42).

In a yet still further embodiment of the present invention, an extended flap portion in connection with the lower limit projection (42) enables the blade (38) to pivotally drop in the direction of said lever (32) at the final stage of the retraction of the plunger (36).

In a yet still further embodiment of the present invention, said blade (38) has an inclined lateral bottom edge engaging in contact relation with said extended flap portion of the lower limit projection (42).

In a yet still further embodiment of the present invention, the terminal gear (24) comprises a back stop mechanism preventing reverse rotation of the terminal gear (24) during the reverse displacement of the toothed track (25) and the plunger (36).

In a yet still further embodiment of the present invention, a transmission gear (12) operatively coupled to said releasing means (20) is provided to drive an electrical generator (19) in electrical connection with a power unit (14).

In a yet still further embodiment of the present invention, said power unit (14) effectuates constant speed rotation and speed regulation of an electric motor (23).

In a yet still further embodiment of the present invention, said power unit (14) is supplied power through an external source of electrical power.

In a yet still further embodiment of the present invention, said transmission gear (12) is operatively coupled to said electrical generator (19) through a rotary balance weight (31) thereinbetween.

In a yet still further embodiment of the present invention, said hydraulic pump (13) is driven by said electric motor (23).

In a yet still further embodiment of the present invention, said hydraulic pump (13) is driven through a drive gear (16) and a crank arm (41).

In a yet still further embodiment of the present invention, a fixedly secured counter spring (35) is provided on the axis of displacement of the plunger (36).

In a yet still further embodiment of the present invention, the compressible spring (11) is of the spiral helically-coiled type formed of high strength metal or composite material.

The invention claimed is:

1. An energy storage apparatus (10) comprising a compressible spring (11) extending between a releasing means (20) and a compressing means (21),
    said compressing means (21) and releasing means (20) being in a fixedly attached relationship with said compressible spring (11) at two ends thereof,
    said compressing means (21) and releasing means (20) being rotatable at different speeds so as to compress the compressible spring (11) at one longitudinal side thereof while simultaneously releasing the compressible spring (11) at the other longitudinal side,
    said energy storage apparatus (10) further comprising a hydraulic jack (26) continuously driven by a hydraulic pump (13) in the manner that said compressible spring (11) is compressed by said compressing means (21) to which rotational movement is imparted by said hydraulic jack (26) and,
    said hydraulic jack (26) is periodically released by a hydraulic valve (22) in constant intervals to provide continuous unidirectional rotary movement of constant speed to said compressing means (21).

2. The energy storage apparatus (10) as set forth in claim 1, wherein the compressible spring (11) is wound around a main shaft (28) and said compressing means (21) and releasing means (20) are in a fixedly attached relationship with said compressible spring (11) at two ends of the main shaft (28).

3. The energy storage apparatus (10) as set forth in claim 2, wherein said compressing means (21) is rotatable relative to said main shaft (28) and said releasing means (20) is rotatable in synchronism with the main shaft (28).

4. The energy storage apparatus (10) as set forth in claim 2, wherein the hydraulic jack (26) moves a toothed track (25) rotating a terminal gear (24) rotatably supported in meshed engagement relation with said toothed track (25).

5. The energy storage apparatus (10) as set forth in claim 2, wherein the apparatus further comprises a valve control means (40) synchronously movable in connection with a plunger (36) of the hydraulic jack (26) such that two limit projections (42) of the valve control means (40) activate a lever (32) of the hydraulic valve (22) at an extended position of the plunger (36) and subsequently instantly take said lever (32) to a non-activated position in a retracted position of the plunger (36).

6. The energy storage apparatus (10) as set forth in claim 5, wherein a lower limit projection of the two limit projections (42) of the valve control means (40) moves the lever (32) up to release the hydraulic jack (26) and an upper limit projection of the two limit projections (42) takes the lever to the non-activated position at the final stage of the retraction of the plunger (36).

7. The energy storage apparatus (10) as set forth in claim 6, wherein the hydraulic jack (26) moves a toothed track (25) rotating a terminal gear (24) rotatably supported in meshed engagement relation with said toothed track (25) and,
    wherein the lower limit projection (42) of the valve control means (40) switches the lever (32) of the hydraulic valve (22) only when the toothed track (25) reaches a predetermined uppermost position.

8. The energy storage apparatus (10) as set forth in claim 6, wherein the energy storage apparatus (10) further comprises a blade (38) pivotally supported by a blade holder (39) in the manner that said blade (38) automatically bends over said lever (32) at an instant subsequent to when said lever (32) is taken to the non-activated position by the upper limit projection (42).

9. The energy storage apparatus (10) as set forth in claim 8, wherein an extended flap portion in connection with the lower limit projection (42) enables the blade (38) to pivotally drop in the direction of said lever (32) at the final stage of the retraction of the plunger (36).

10. The energy storage apparatus (10) as set forth in claim 9, wherein said blade (38) has an inclined lateral bottom edge engaging in contact relation with said extended flap portion of the lower limit projection (42).

11. The energy storage apparatus (10) as set forth in claim 5, wherein the hydraulic jack (26) moves a toothed track (25) rotating a terminal gear (24) rotatably supported in meshed engagement relation with said toothed track (25) and, wherein the terminal gear (24) comprises a back stop mechanism preventing reverse rotation of the terminal gear (24) during the reverse displacement of the toothed track (25) and the plunger (36).

12. The energy storage apparatus (10) as set forth in claim 5, wherein a fixedly secured counter spring (35) is provided on the axis of displacement of the plunger (36).

13. The energy storage apparatus (10) as set forth in claim 1, wherein a transmission gear (12) operatively coupled to said releasing means (20) is provided to drive an electrical generator (19) in electrical connection with a power unit (14).

14. The energy storage apparatus (10) as set forth in claim 13, wherein said power unit (14) effectuates constant speed rotation and speed regulation of an electric motor (23).

15. The energy storage apparatus (10) as set forth in claim 14, wherein said hydraulic pump (13) is driven by said electric motor (23).

16. The energy storage apparatus (10) as set forth in claim 15, wherein said hydraulic pump (13) is driven through a drive gear (16) and a crank arm (41).

17. The energy storage apparatus (10) as set forth in claim 13, wherein said power unit (14) is supplied power through an external source of electrical power.

18. The energy storage apparatus (10) as set forth in claim 13, wherein said transmission gear (12) is operatively coupled to said electrical generator (19) through a rotary balance weight (31) thereinbetween.

19. The energy storage apparatus (10) as set forth in claim 1, wherein the compressible spring (11) is of the spiral helically-coiled type formed of metal or composite material.

* * * * *